(12) United States Patent
Krull et al.

(10) Patent No.: US 8,613,786 B2
(45) Date of Patent: *Dec. 24, 2013

(54) FLUID FILTER

(75) Inventors: Timothy L. Krull, Kearney, NE (US);
Steven J. Merritt, Kearney, NE (US);
Steven M. Todd, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 128 days.

This patent is subject to a terminal disclaimer.

(21) Appl. No.: 12/966,765

(22) Filed: Dec. 13, 2010

(65) Prior Publication Data

US 2011/0100898 A1 May 5, 2011

Related U.S. Application Data

(63) Continuation-in-part of application No. 11/320,200, filed on Dec. 28, 2005, now Pat. No. 7,850,755.

(60) Provisional application No. 60/640,076, filed on Dec. 29, 2004.

(51) Int. Cl.
*B01D 27/08* (2006.01)

(52) U.S. Cl.
USPC ............... 55/498; 55/502; 210/440; 210/443; 210/450; 210/452

(58) Field of Classification Search
USPC ........... 55/317, 320, 337, 359, 404, 447, 476, 55/432, 495, 492, 498, 502; 210/232, 210/416.4, 416.5, 443, 450, 452, 248, 130, 210/440, DIG. 17; 29/896.2, DIG. 77
See application file for complete search history.

(56) References Cited

U.S. PATENT DOCUMENTS

| | | | |
|---|---|---|---|
| 4,028,243 A | 6/1977 | Offer et al. | |
| 4,253,954 A | 3/1981 | Midkiff et al. | |

(Continued)

FOREIGN PATENT DOCUMENTS

| | | |
|---|---|---|
| DE | 20 2007 012691 U1 | 2/2009 |
| EP | 0 426 064 A2 | 5/1991 |

(Continued)

OTHER PUBLICATIONS

International Search Report from PCT/US2011/064385, 2011.

(Continued)

*Primary Examiner* — Duane Smith
*Assistant Examiner* — Minh-Chau Pham
(74) *Attorney, Agent, or Firm* — Leydig, Voit & Mayer, Ltd.

(57) ABSTRACT

A fluid filter includes a base plate, a canister, and filtering media contained in the canister for filtering fluid from an inlet port to an outlet port. Notches are formed into an outer periphery of the base plate. An annular bead of the canister side wall is partially formed into the notches to provide a torque locking mechanism between the base plate and the canister. The terminating lip portion of the canister is wrapped around the outer face of the base plate and formed into an annular trough to directly secure the base plate to the canister. The annular trough includes a diverging outer wall that provides a narrow contact interface between the terminating lip portion and the retention corner of the base plate to thereby reduce moment loads induced therebetween as a result of high fluid pressures in the filter.

20 Claims, 10 Drawing Sheets

(56) References Cited

U.S. PATENT DOCUMENTS

| | | | |
|---|---|---|---|
| 4,369,113 A | 1/1983 | Stifelman | |
| 4,743,374 A | 5/1988 | Stifelman | |
| 4,832,844 A | 5/1989 | Ayers | |
| 4,834,885 A | 5/1989 | Misgen et al. | |
| 4,969,994 A | 11/1990 | Misgen et al. | |
| 5,080,787 A | 1/1992 | Brown et al. | |
| 5,453,195 A | 9/1995 | Jorgenson et al. | |
| 5,490,930 A | 2/1996 | Krull | |
| 5,906,736 A | 5/1999 | Bounnakhom et al. | |
| 5,906,740 A | 5/1999 | Brown et al. | |
| 6,139,738 A | 10/2000 | Maxwell | |
| 6,361,574 B1 | 3/2002 | Decker | |
| 6,554,140 B2 | 4/2003 | Steger, Jr. et al. | |
| 6,823,996 B2 * | 11/2004 | Durre | 210/443 |
| 6,863,811 B2 * | 3/2005 | Janik | 210/232 |
| 7,294,161 B2 | 11/2007 | Connor et al. | |
| 7,435,341 B2 | 10/2008 | Crawford et al. | |
| 7,850,755 B2 * | 12/2010 | Krull et al. | 55/498 |
| 2004/0084360 A1 | 5/2004 | Janik | |
| 2007/0251201 A1 | 11/2007 | Miller | |
| 2008/0041026 A1 | 2/2008 | Engel et al. | |
| 2008/0066435 A1 | 3/2008 | Engel et al. | |
| 2009/0145095 A1 | 6/2009 | Juliar et al. | |
| 2010/0126924 A1 | 5/2010 | Hawkins et al. | |
| 2010/0193417 A1 | 8/2010 | Gohl et al. | |

FOREIGN PATENT DOCUMENTS

| | | |
|---|---|---|
| EP | 0 925 816 A1 | 6/1999 |
| GB | 580 819 A | 9/1946 |
| JP | 2-501902 | 6/1990 |
| JP | 03-154607 | 7/1991 |
| JP | 10-202016 | 8/1998 |
| JP | 11-244617 | 9/1999 |
| JP | 2002-542923 | 12/2002 |
| WF | 88/05333 | 7/1988 |
| WO | 00/66244 | 11/2000 |

OTHER PUBLICATIONS

International Search Report from PCT/US2005/047207, 2005.

* cited by examiner

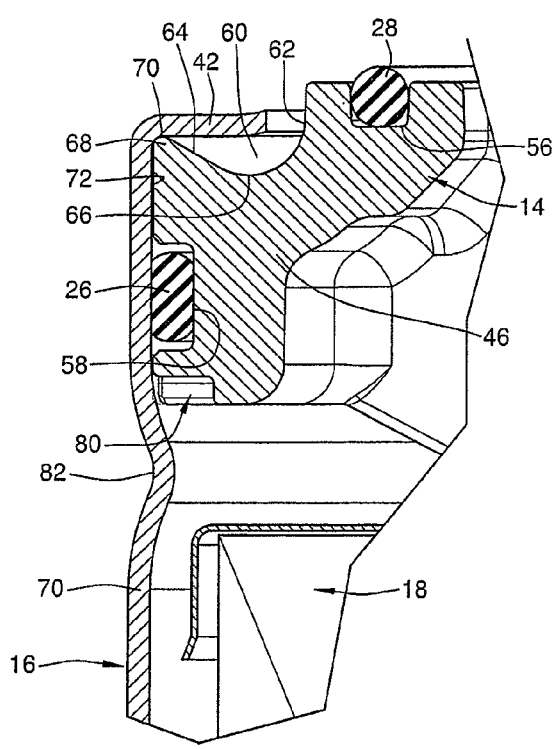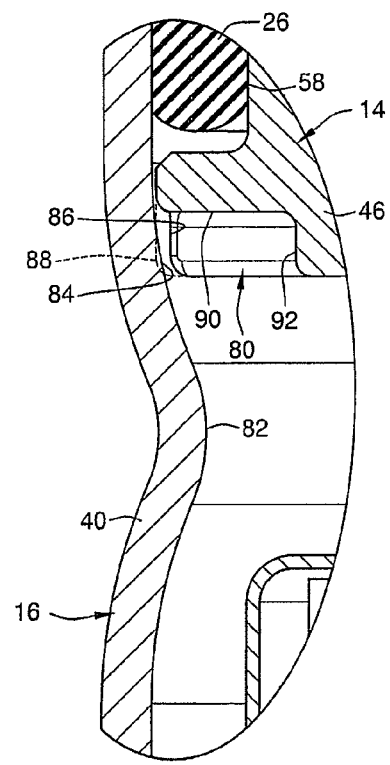

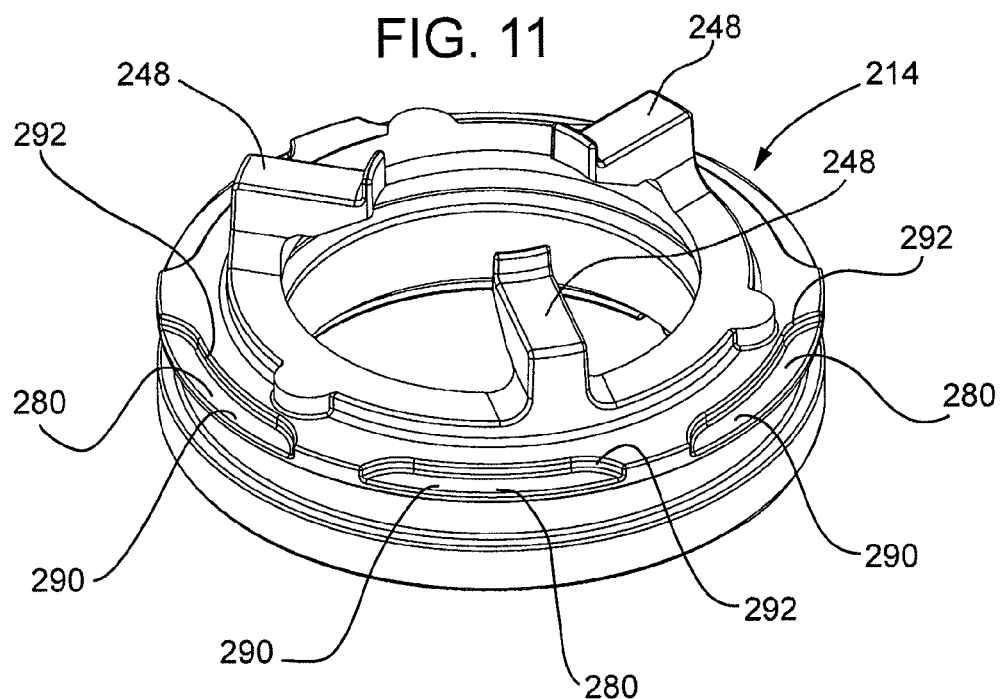
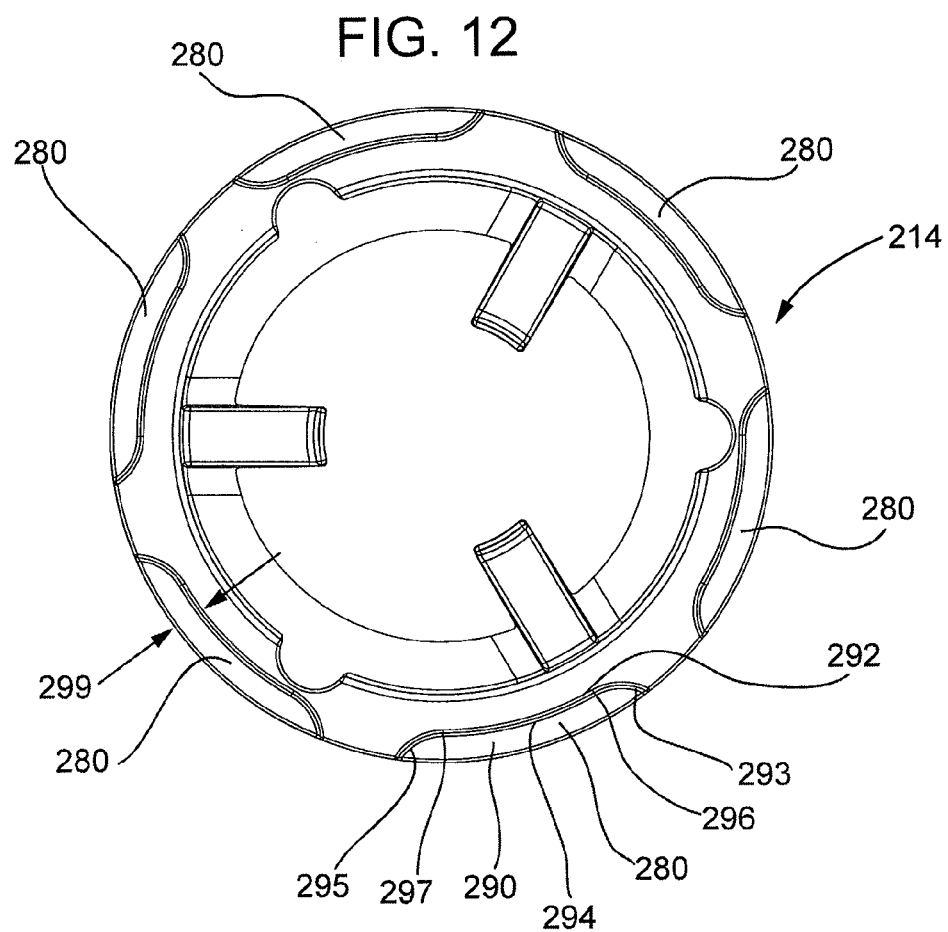

FLUID FILTER

CROSS-REFERENCE TO RELATED APPLICATIONS

This patent application is a continuation-in-part of U.S. patent application Ser. No. 11/320,200, filed on Dec. 28, 2005, now U.S. Pat. No. 7,850,755 B2, which is incorporated herein by reference in its entirety. U.S. patent application Ser. No. 11/320,200 claims the benefit of U.S. Provisional Patent Application No. 60/640,076, filed Dec. 29, 2004, which is incorporated herein by reference in its entirety.

BACKGROUND OF THE INVENTION

Hydraulic spin-on fluid filters are well known in the art and are typically used for the purpose of filtering hydraulic working fluid in the hydraulic circuit of an engine and/or vehicle. Such hydraulic fluid filters typically comprise an end plate either stamped or cast of metal material. A cylindrical drawn metal canister is secured directly or indirectly to the end plate (e.g. indirect attachment can be done by way of a seaming lid, which also serves to retain an external seal) and a suitable filter element contained therein. The filter element often includes cylindrical pleated filter media, but may also be any other form of suitable filtering media. The end plate of the filter usually includes a central threaded hole which serves as means to provide at least one fluid port for the filter element and also provides a means for mounting and threadedly fastening the filter to the mounting adaptor of a fluid circuit. Examples of such fluid filters are shown for example in U.S. Pat. Nos. 5,906,740; 5,453,195; 5,490,930; 5,906,736; and 6,554,140. Since the present invention relates to improvements over these prior designs, and may be incorporated into these designs, the patents are hereby incorporated by reference.

As it pertains to high pressure spin-on type filters, there are several different considerations in the design of the filter. For example, the '740, '195 and '930 patents referenced above discuss the importance of having high strength to resist high pressure when in use (both burst strength and cyclical fatigue strength). It is also known to connect the end plate or base plate to the canister directly thereby avoiding the use of a separate seaming lid to facilitate a connection to reduce the number of parts. However, in doing so, a significant consideration when attaching the end plate directly to the cylindrical side wall of the canister is how best to torsionally lock the end plate to the canister since installation and removal of the filter requires spinning the canister and transferring torque from the canister to the end plate. This is necessary to drive the internal threading formed into the end plate onto and off the threaded stub of a mounting adaptor for the fluid circuit. One such technique, for example, is proposed in the '740 patent, as shown, for example, in FIGS. 8-10.

BRIEF SUMMARY OF THE INVENTION

There are multiple aspects of the present invention for which separate and independent patent coverage is sought as represented by the claims appended hereto One aspect of the present invention relates to an improved mechanism for providing torque transfer between an end plate and the canister of a filter. According to this aspect, an end plate may have thread means for releasable mounting of the filter; and port means for inletting and outletting fluid into and out of the filter. The filter may also include a canister having an annular side wall with a closed end portion. The annular side wall of the canister extends axially from the closed end portion to the end plate and extends around an outer periphery of the end plate. The side wall may include an annular terminating lip portion that is wrapped radially inward over the end plate. Contained within the canister and end plate is filtering means comprising suitable filtering media for filtering fluid. At least one notch is formed into the outer periphery of the end plate and a locking portion of the side wall portion is formed radially inwardly into locking engagement with the at least one notch, thereby providing an improved torque transfer means between the end plate and the canister.

A further aspect of the present invention is directed toward a filter having improved cyclical fatigue resistance. In accordance with this aspect, a filter may include an end plate having port means for inletting and outletting fluid into and out of the filter and a canister having an annular side wall with a closed end portion. The annular side wall of the canister extends axially from the closed end portion to the end plate and extends around the outer periphery of the end plate. The side wall may include an annular terminating lip portion that is wrapped radially inward over the end plate. Contained in the canister is filtering means comprising suitable filtering media for filtering fluid. An annular trough may be formed in the end plate along an exterior surface thereof for receipt of the terminating lip portion. The annular trough may have a bottom, an inside annular wall and an outside annular wall. The outside annular wall may diverge outwardly from the bottom in a substantially oblique manner relative to the annular canister side wall. The outside annular wall trough may form an outer peripheral retention corner which is rigid and has sufficient thickness or radial width at its base to provide for strength and to prevent breakage of the end plate outer periphery while also being very narrow or radially thin at the top or corner so as to provide a very short contact surface which engages the terminating lip portion. An advantage of this configuration is that the moment forces induced on the terminating lip portion of the canister are reduced during pressure loads imposed upon the canister which thereby improves fatigue resistance and overall strength of the filter.

Other aspects and advantages of the invention will become more apparent from the following detailed description when taken in conjunction with the accompanying drawings.

BRIEF DESCRIPTION OF THE DRAWINGS

FIGS. 4 and 5 are enlarged views of an upper corner section of FIG. 1 with dashed lines indicating where the base plate would be but for the notch (thus schematically indicating the interference and torque locking engagement)

FIG. 11 is an isometric view of the base plate.

FIG. 12 is a bottom view of the base plate.

in FIG. 13.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
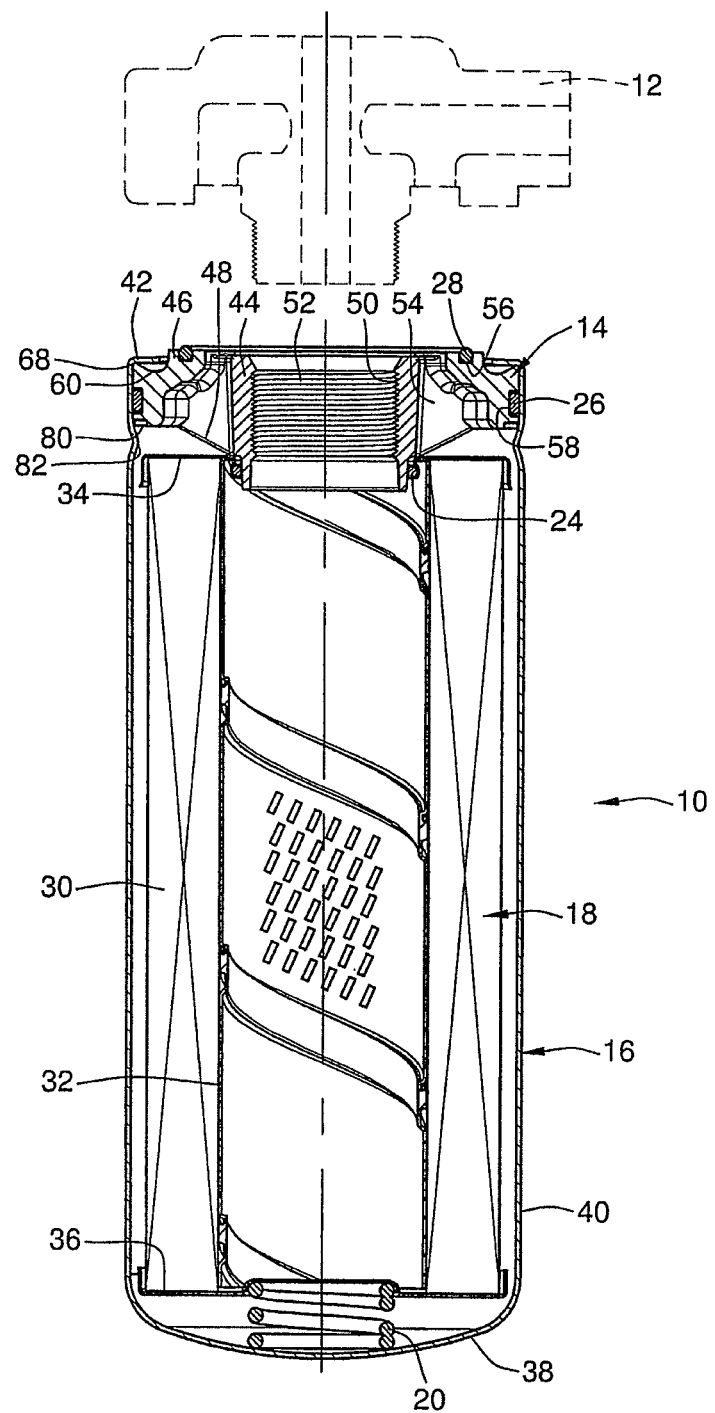
FIG. 1 is a cross-sectional view of a filter in accordance with an embodiment of the present invention taken about line 1-1 of FIG. 2, with an example of a mounting adaptor indicated in dashed lines.

Referring to FIG. 1, an embodiment of a filter 10 is shown in the various drawings for use with a mounting adaptor 12 of a fluid circuit. The mounting adaptor 12 is shown in dashed lines to make clear that the mounting adaptor is not part of the invention, but merely shown to illustrate the environment in which the subject filter 10 may operate and how the filter 10 can be spun on and threadedly connected to the mounting adaptor 12 and a fluid circuit.

The filter 10 may include several components including an end plate embodiment in the form of a cast metal base plate 14, a deep drawn steel canister 16, an internal filter element 18, a coil spring 20 and various internal and external ring seals 24, 26, 28. The filter element 18 may comprise suitable filtering media 30 (such as pleated filter paper, fiberglass filtering media, or other such suitable media), a central perforated tubular support 32, and top and bottom end caps 34, 36 which are potted or otherwise sealingly secured to opposed ends of the filtering media 30. The top end cap 34 may include a central opening to provide for fluid passage therethrough. The bottom end cap 36 may be closed and may be urged upwardly by the coil spring 20 such that the filter element 18 is biased toward and against the base plate 14. The internal seal 24 may be provided between the base plate 14 and the filter element 18 for purposes of preventing short circuiting of unfiltered fluid along the inner periphery of the filter element between the base plate and the filter element.

The canister 16 may include a closed dome-shaped end 38 and a cylindrical side wall 40 extending axially therefrom toward the base plate. The side wall 40 may extend up and around an outer cylindrical periphery of the base plate 14 and may include an outer annular terminating lip portion 42 that is deformed radially inward and wrapped over the top end face of the base plate 14 to directly secure the base plate 14 to the canister 16.

Figure 2:
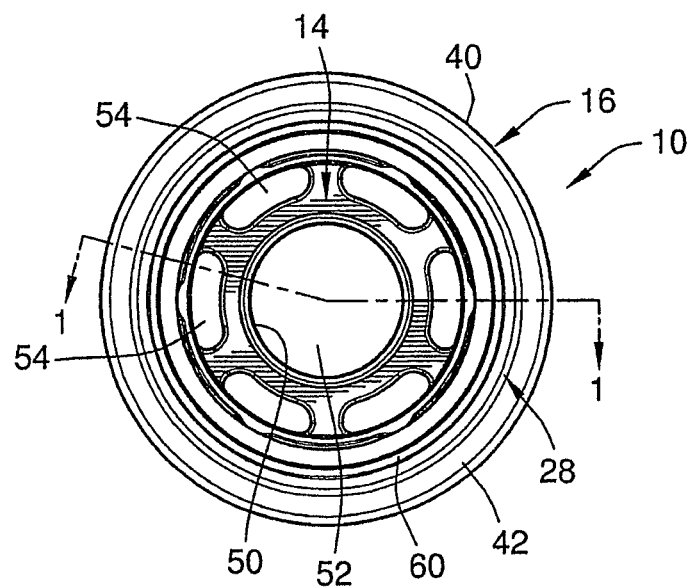
FIG. 2 is a top end view of the filter shown in FIG. 1.
Figure 3:
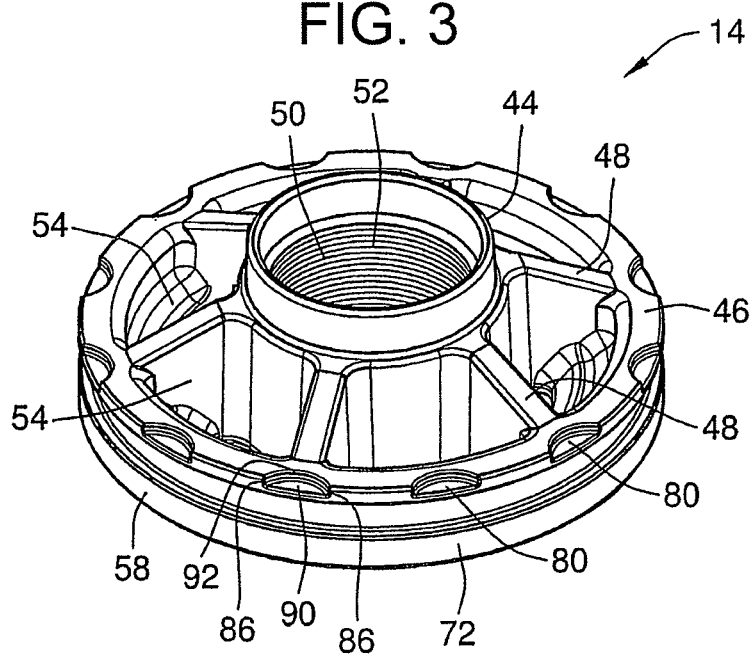
FIG. 3 is an isometric underside view of a cast metal base plate used in the filter embodiment shown in FIG. 1.

The base plate 14 may be cast from metal material such as aluminum, but could also potentially be a stamped steel component, or otherwise appropriately formed. Referring to FIG. 3, the base plate 14 may include a central hub 44 and an outer peripheral annular rim 46 which are connected together by ribs 48 extending radially therebetween. The central hub 44 may include a threaded central opening 50 which also provides for an outlet port 52. Referring to FIG. 2, the void space between adjacent ribs 48 provides for various inlet ports 54 arranged radially around the central hub 44.

The inlet and outlet ports 52, 54 provide means for inletting and outletting fluid into and out of the fluid filter, although it will also be appreciated that it is also known to have a single threaded opening to facilitate inlet and outlet means such as shown, for example, in some of the aforementioned referenced patents. Thus, in other embodiments, such alternate port means for inletting and outletting fluid may be used.

Referring to FIG. 1, the outer peripheral rim 46 of the base plate 14 may include an external annular groove 56 which receives the external seal 28 for providing a seal between the filter 10 and the mounting adaptor 12. The base plate may also include an outer peripheral groove 58 which receives an internal seal 26 for purposes of sealing between the base plate 14 and the canister 16 to prevent fluid leakage therebetween.

Referring to FIG. 4, the outer peripheral rim 46 of the base plate 14 may include an annular trough 60 formed into the top or external side of the base plate 14. This annular trough 60 may include an inner annular wall 62, an outer annular wall 64 and a bottom 66. The outer annular wall 64 diverges outward from the bottom 66 in a substantially oblique manner relative to the annular side wall of the filter cartridge to form an outer peripheral retention corner portion 68. This corner portion 68 may be wider at the base and narrower at the top or end such that the corner portion 68 is structurally strong and not prone to breakage or fracture while at the same time a very narrow contact surface is provided for engagement with the terminating lip portion 42 of the filter 10. This short engagement or contact interface 70 shortens the lever arm and thereby moment loads when fluid pressure in the canister tends to urge the canister away from the base plate.

Figure 6:
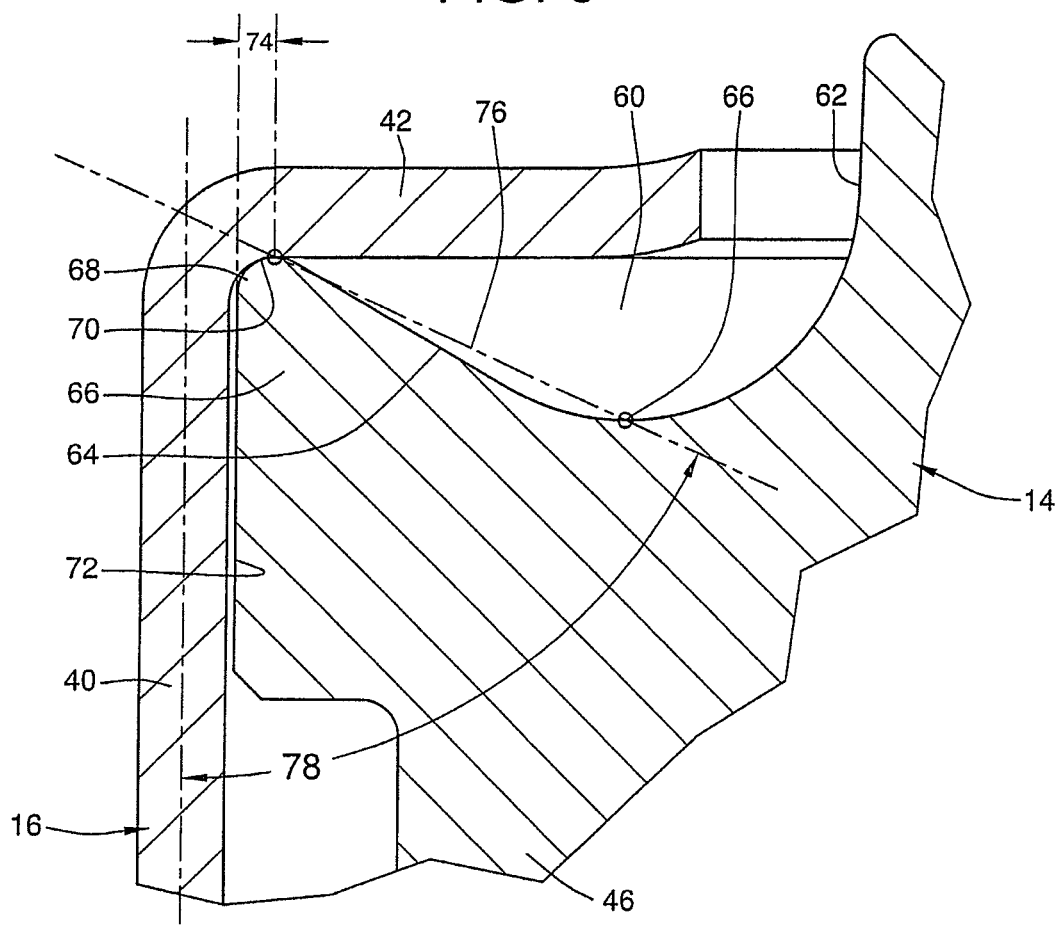
FIG. 6 is an enlarged illustration of an upper corner portion of FIG. 1 with reference lines and measurements being indicated to show how the filter embodiment of FIG. 1 reduces moment loads generated on the terminating lip portion of the canister at the engagement interface with the outer periphery of the base plate.

Referring to FIG. 6, the contact interface 70 extends radially inward toward the filter center a distance measured from the outer cylindrical periphery 72 of the base plate 14 (namely, the radial width) a distance 74. In a first embodiment, the distance 74 may be about 0.02 inches given about a 1.5-2.5 inch radius base plate. In a second embodiment, the distance 74 may be less than 0.03 inches. In a third embodiment, the distance 74 may be less than 0.05 inches. In a fourth embodiment, the distance 74 may be less than 0.07 inches. To provide for strength of the corner portion 68, the outer wall 64 extends in a substantially oblique manner. This may be accomplished in a number of ways. Although a generally flat inclined surface of the outer wall 64 is shown extending from the bottom 66 to the contact interface 70, it will be appreciated that this shape may be curved, irregular or the like and still encompassed within the context of the present invention.

The outside annular wall 64 may create a geometry or configuration with an axis 76 measured from the trough bottom 66 to the innermost point of contact between the retention corner portion 68 and the terminating lip portion 42 (e.g. where the contact face terminates at its inner diameter), which axis 76 forms an acute angle 78. In a first embodiment, the angle 78 may be between about 55 and 65 degrees relative to the side wall. In a second embodiment, the angle 78 may be greater than about 50 degrees. In a third embodiment, the angle 78 may be greater than about 35 degrees.

Referring to FIGS. 3 and 4, at least one notch 80 may be formed into the outer periphery of the base plate for providing a locking torque mechanism. In one embodiment, multiple notches 80 are arranged in an annular array radially around the outer periphery of the peripheral rim 46 of the base plate 14 as shown, for example, in FIG. 3. The notches 80 may be cast or stamped into the base plate 14 or can be machined or cut out.

Referring to FIG. 5, the side wall may include an inwardly deformed annular bead 82 which may include a locking portion 84 which is partially and radially received into each notch 80 and interferes with the shoulder 86 which is formed at each terminating edge of the notch 80. This is shown schematically in FIGS. 4 and 5 where dotted lines are illustrated to show where the outer cylindrical periphery of the base plate 14 would extend, but for the formation of the notch 80, thus showing a slight radial interference indicated at 88. This provides for a torque locking mechanism between the base plate 14 and the canister 16. The notches 80 may include a generally planar bottom 90 and an arch-shaped side wall 92, opposing ends of which form the shoulders 86. In one embodiment, this arrangement is located below the provision of the internal seal 26 and at the bottom outer peripheral corner of the base plate, but it may also be done at other outer peripheral locations. It will be appreciated, however, other shapes and configurations for the notches may also be used.

Figure 7:
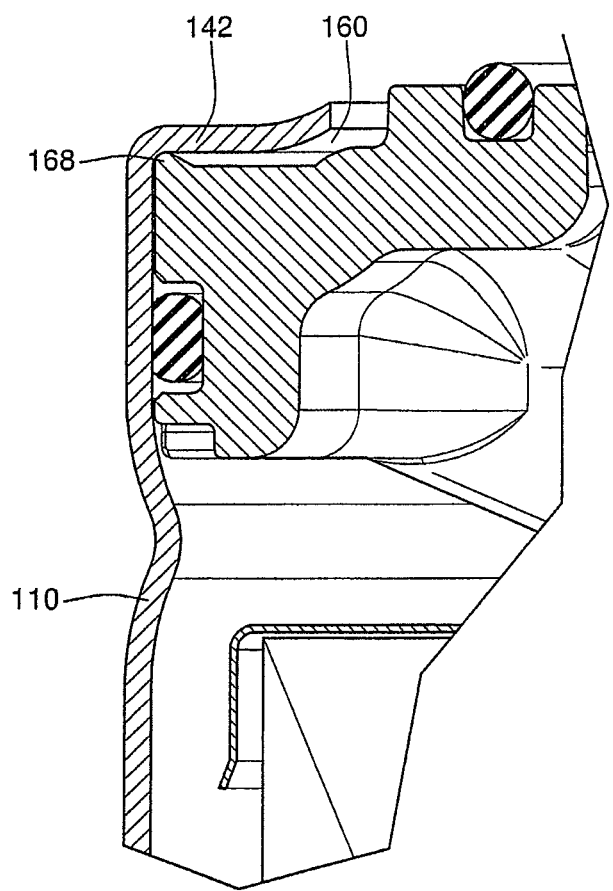
FIG. 7 is a cross-sectional view of another embodiment.
Figure 8:
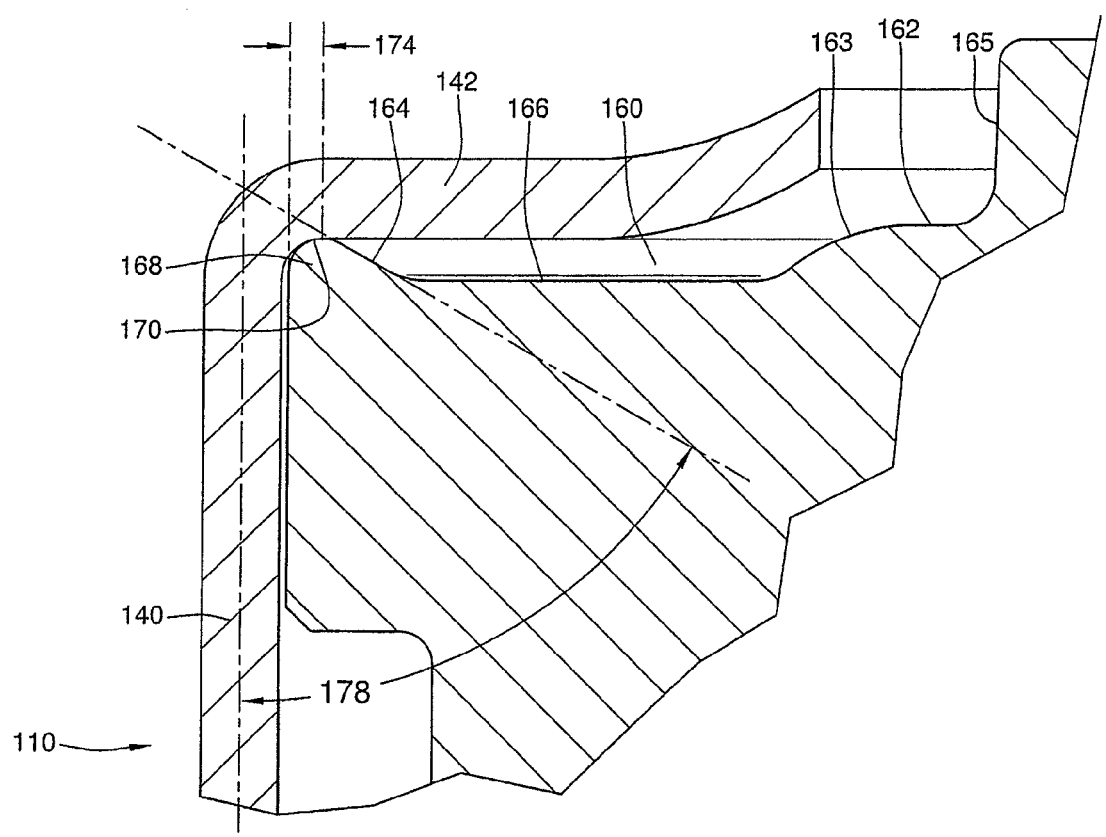
FIG. 8 is an enlarged cross-sectional view of FIG. 7.

Another embodiment of a filter is shown in FIGS. 7 and 8. The filter 110 is similar to filter 10 except that the base plate 114 has a different shape for the trough 160. The trough 160 may include an inner wall 162, an outer wall 164 and a bottom 166. The outer wall 164 diverges outward from the bottom 166 in a substantially oblique manner relative to the annular side wall of the filter cartridge to form a retention corner portion 168.

This corner portion 168 may be wider at the base and narrower at the top or end such that the corner portion 168 is structurally strong and not prone to breakage or fracture while at the same time a very narrow contact surface is provided for engagement with the terminating lip portion 142 of the filter 110. This short engagement or contact interface 170 shortens the lever arm and thereby moment loads when fluid pressure in the canister tends to urge the canister away from the base plate.

Referring to FIG. 8, the contact interface 170 extends radially inward toward the filter center a distance measured from the outer cylindrical periphery 172 of the base plate 114 (namely, the radial width) a distance 174. In a first embodiment, the distance 174 may be about 0.02 inches given about a 1.5-2.5 inch radius base plate. In a second embodiment, the distance 174 may be less than 0.03 inches. In a third embodiment, the distance 174 may be less than 0.05 inches. In a fourth embodiment, the distance 74 may be less than 0.07 inches. To provide for strength of the corner portion 168, the outer wall 164 extends in a substantially oblique manner. This may be accomplished in a number of ways. Although a generally flat inclined surface of the outer wall 164 is shown extending from the bottom 166 to the contact interface 170, it will be appreciated that this shape may be curved, irregular or the like and still encompassed within the context of the present invention.

The outside annular wall 164 may have an angle 178 measured from the trough bottom 166 to the innermost point of contact between the retention corner portion 168 and the terminating lip portion 142 (e.g. where the contact face terminates at its inner diameter). In a first embodiment, the angle 178 may be between about 55 and 65 degrees relative to the side wall. In a second embodiment, the angle 178 may be greater than about 50 degrees. In a third embodiment, the angle 178 may be greater than about 35 degrees.

In this embodiment, the inner wall 162 has a curved portion 163 and a straight portion 165. The curved portion 163 may curve upwardly toward the end of the filter. The straight portion 165 may be vertical and substantially parallel to the side wall 140. The curved portion 163 may be located between the bottom 166 and the straight portion 165. In this embodiment, the bottom 166 is relatively flat.

Figure 9:
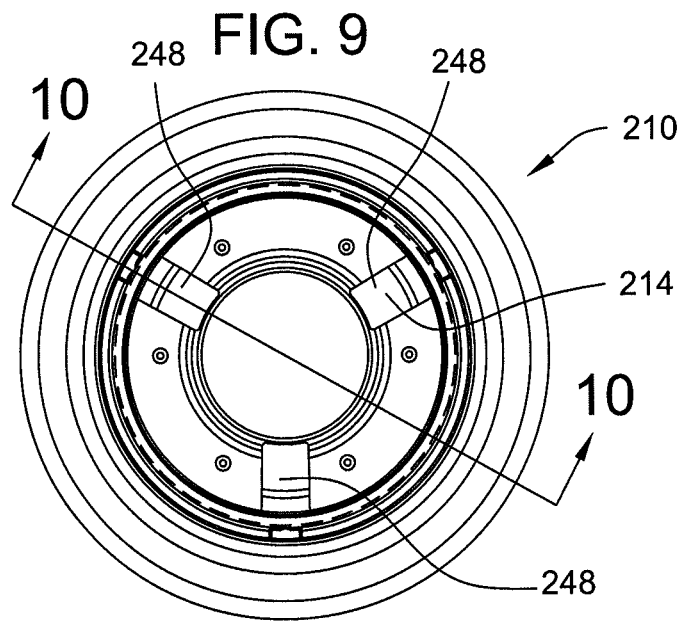
FIG. 9 is a top view of another embodiment of a filter.
Figure 10:
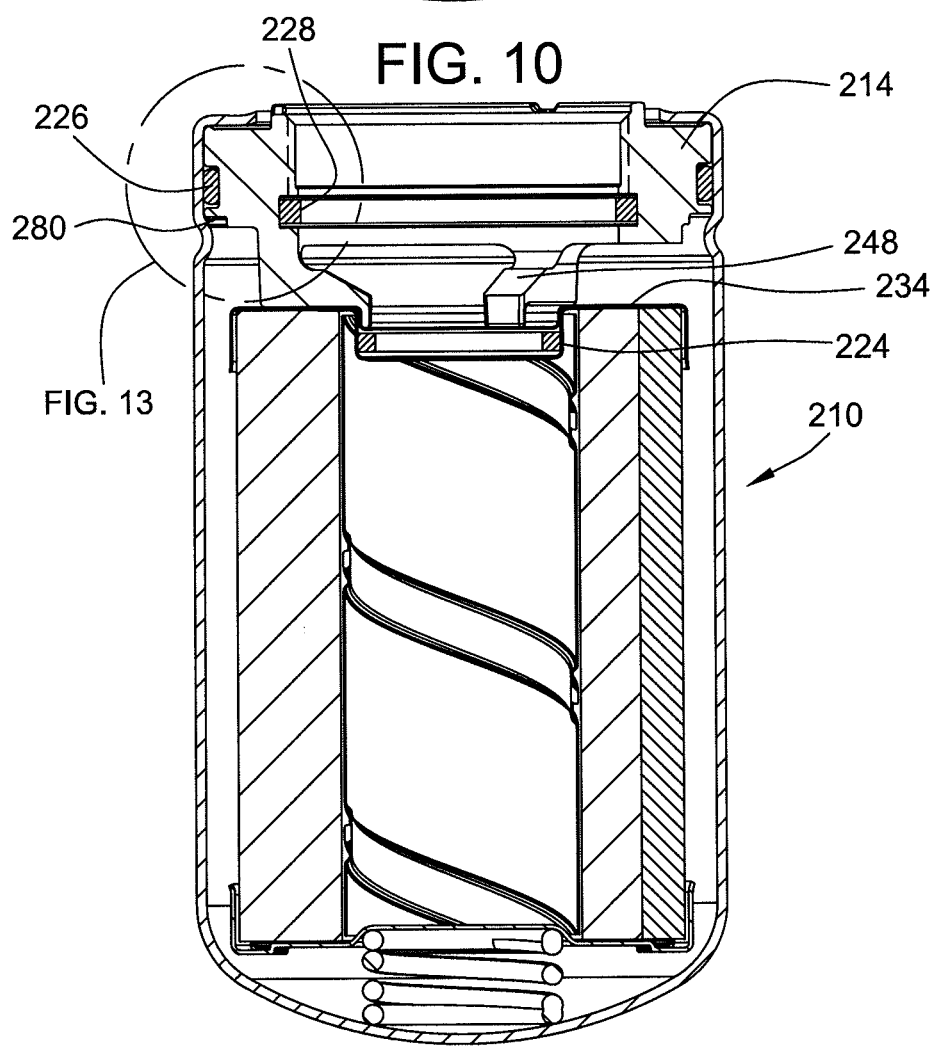
FIG. 10 is a cross-sectional view taken about line 10-10 of FIG. 9.

Referring to FIGS. 9 and 10, another embodiment of a filter is shown. The filter 210 may be similar to filter 110 except that the base plate 214 has a different shape. Referring to FIGS. 10 and 11, the base plate 214 may have a notch 280. The notch 280 may provide a locking torque mechanism. The notch 280 may be in the outer periphery of the base plate 214. In one embodiment, the base plate 214 may include multiple notches 280 arranged in an annular array radially around the outer periphery of the peripheral rim 246 as shown in FIGS. 11 and 12. The base plate 214 may include six notches. In other embodiments, the base plate may include one, two, three, four, five, seven or more notches. The notches 280 may be created by forming, casting, stamping, machining or other process.

Referring to FIG. 11, the notches 280 may include a generally planar bottom 290 and a side wall 292. Referring to FIG. 12, the side wall 292 may include a first portion 293, a second portion 294, and a third portion 295. The first portion 293 may curve inward from the outer periphery toward the center of the filter and connect with the first end 296 of the second portion 294. The second portion 294 may curve along a path which may be parallel to the outer periphery. The third portion 295 may curve inward from the outer periphery toward the center of the filter and connect with the second end 297 of the second portion 294. The ends of the side wall may form shoulders 286.

In one embodiment, the notches 280 may be at the bottom outer peripheral corner of the base plate as shown in FIG. 10. The notches 280 may be located below the internal seal 226. In other embodiments, the notches may be located in other peripheral locations. In other embodiments, other shapes and configurations of the notches may be used.

Figure 13:
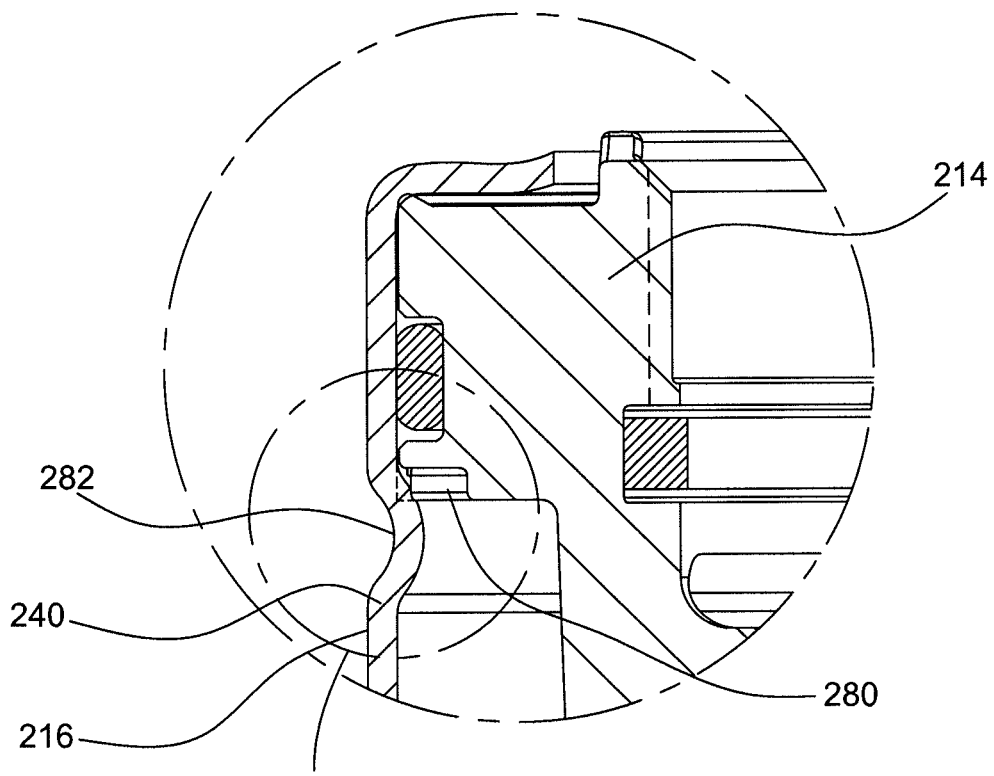
FIG. 13 is an enlarged view of area 13-13 in FIG. 10.
Figure 14:
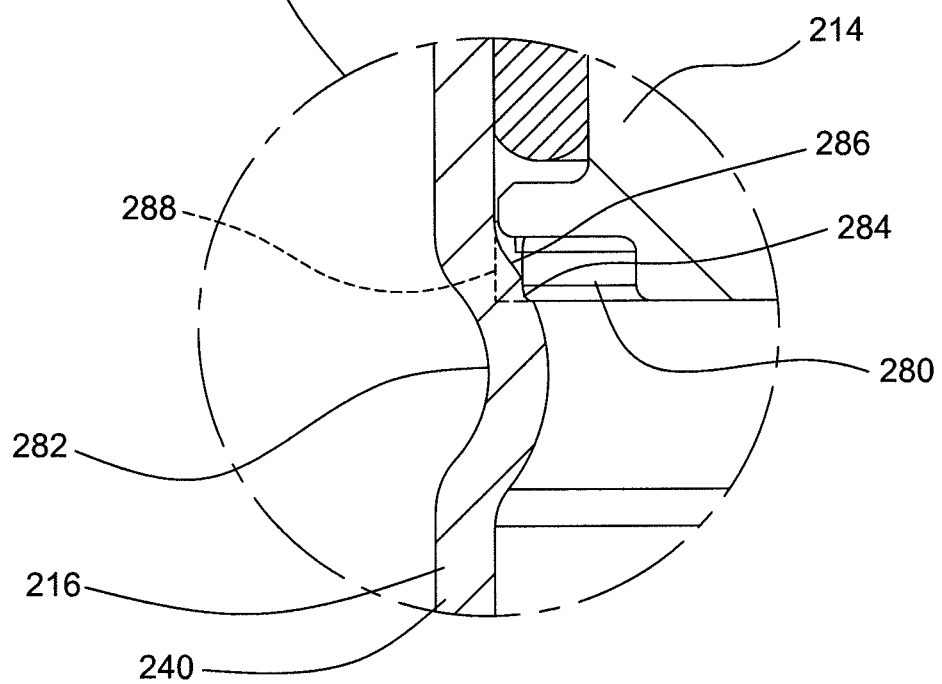
FIG. 14 is an enlarged view of the area 14-14.
Figure 15:
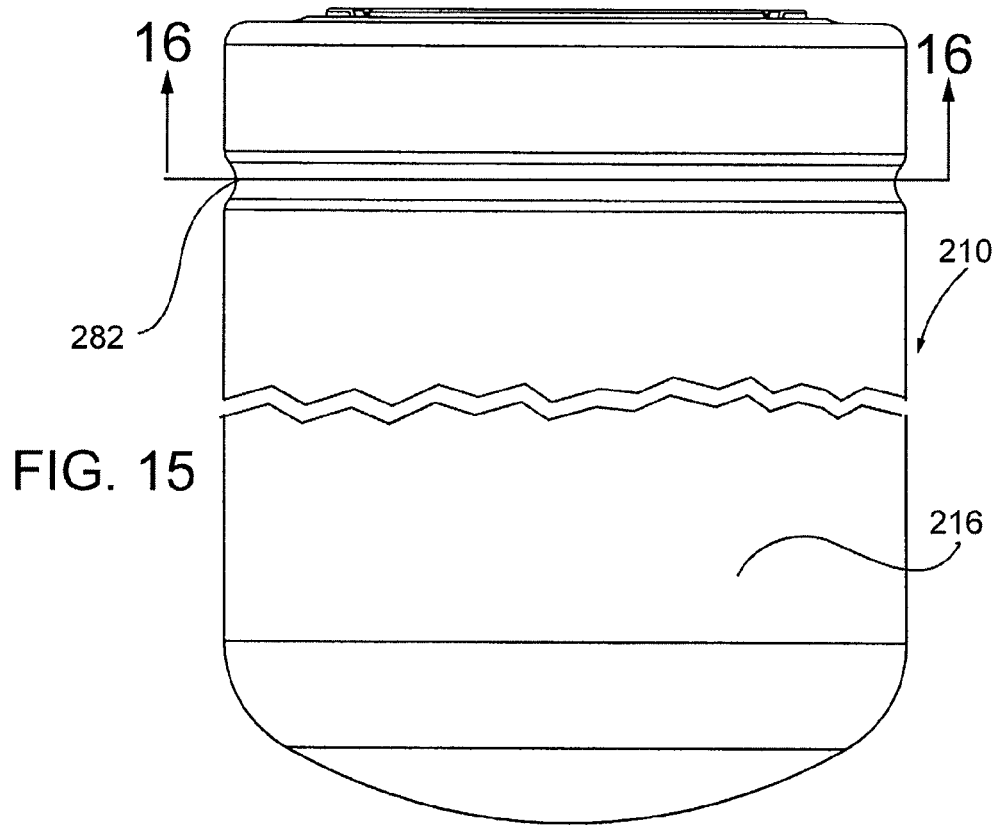
FIG. 15 is a side view of the filter.
Figure 16:
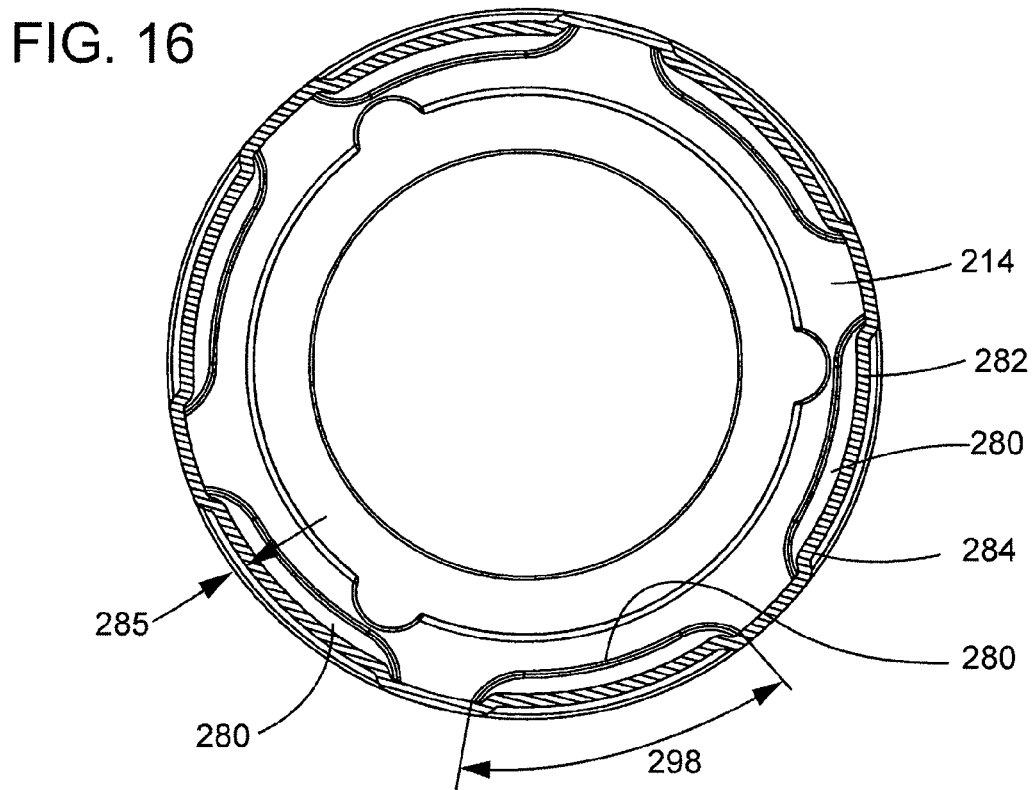
FIG. 16 is a cross-sectional view taken about line 16-16 in FIG. 15.

Referring to FIG. 14, the side wall 240 may include an inwardly deformed bead 282. The bead 282 may be annular. The bead 282 may include a locking portion 284. The locking portion 284 may be partially and radially received into each notch 280. The locking portion 284 may interfere with the shoulder 286 on the notch. This is shown schematically in FIGS. 13 and 14 where dotted lines are illustrated to show where the outer cylindrical periphery of the base plate 214 would extend, but for the formation of the notch 280. The radial interference is indicated at 288. This provides for a torque locking mechanism between the base plate 214 and the canister 216. Referring to FIG. 16, the deformation of the bead 282 to form the locking portion 284 is also shown. The length 298 of the notches 280 allows the locking portion 284 to be deeper than the locking portion 84 in the embodiment shown in FIG. 3. The deeper locking portion 284 creates greater resistance from rotation of the canister 216 relative to the base plate 214 than the locking portion 84 in the embodiment shown for FIGS. 3-5.

Referring to FIG. 16, the notches 280 may have a length 298. The length 298 may have a range from 0.6 inches (1.52 cm) to 2 inches (5.08 cm). In one embodiment, the notch 280 may have a length 298 of 1.18 inches (3 cm). The length 298 may also be expressed in terms of angular degrees of the circumference. The length 298 may have a range from 10 degrees to 77 degrees. In one embodiment, the length 298 may be 47 degrees. Referring to FIG. 12, the notches 280 may have a depth 299. The depth 299 may have a range from 0.6 inches (0.15 cm) to 0.39 inches (0.99 cm). In one embodiment, the notch 280 may have a depth 299 of 0.13 inches (0.33 cm). Referring to FIG. 16, the locking portion may have a depth 285. The depth 285 may have a range from 0.035 inches (0.09 cm) to 0.094 inches (0.24 cm). In one embodiment, the depth 285 may be 0.04 inches (0.10 cm).

Referring to FIG. 10, the filter 210 may have a seal 224. The seal 224 may provide a seal between the filter 210 and the mounting adaptor. The filter 210 may have a seal 228. The base plate 214 may have a groove which receives the seal 228. The seal 228 may provide a seal between the filter 210 and the mounting adaptor. Referring to FIGS. 9, 10, and 11, the base plate 214 may include ribs 248. The ribs 248 may engage the top end cap 234.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor(s) for carrying out the invention. Variations of those preferred embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter, comprising:
   a base plate formed of cast material, the base plate having an outer rim and an inner hub, the inner hub defining a threaded opening;
   a canister having a generally cylindrical side wall portion and a closed dome end portion; the side wall portion extending from a closed dome end portion around an outer periphery of the base plate with the side wall portion secured to the base plate;
   filtering media contained in the canister and interposed along a flow path extending between the first and second fluid ports;
   at least one notch formed into the outer periphery of the base plate; and
   a locking portion of the side wall portion being formed radially inwardly into locking engagement with the at least one notch.

2. The filter of claim 1 wherein the at least one notch comprises a plurality of notches disposed radially around the outer periphery of the base plate.

3. The filter of claim 2 wherein the locking portion is formed via a continuous bead formed into the side wall portion.

4. The filter of claim 3 further comprising an annular groove formed into the outer periphery of the base plate, and an annular seal in the groove sealing between the side wall portion and the base plate.

5. The filter of claim 4 wherein the base plate comprises an exterior face and an interior face, the cast material of the base plate defined axially between the exterior and interior faces, and wherein notches are formed into the interior face.

6. The filter of claim 5 wherein each of said notches has a bottom and a side wall.

7. The filter of claim 6 wherein the side wall of the notch has a first portion, a second portion, and a third portion.

8. The filter of claim 7 wherein the first portion curves inwardly from the outer periphery, the second portion curves along a path generally parallel to the outer periphery, and the third portion curves inwardly from the outer periphery.

9. The filter of claim 1 wherein the locking portion has a depth, the depth of the locking portion has a range from 0.035 inches (0.09 cm) to 0.094 inches (0.24 cm).

10. The filter of claim 1 wherein the side wall includes a terminating annular lip portion defining an annular terminating edge, the annular lip portion being wrapped radially inward over the base plate to secure the canister to the base plate.

11. A filter for removable connection to a mounting adaptor of a fluid circuit, comprising:
    a base plate having thread means for removable mounting to the mounting adaptor;
    a canister having an annular side wall and a closed end portion, the annular side wall extending from the closed end portion to the base plate, the side wall including an annular terminating lip portion wrapped around an outer periphery of the base plate;
    filtering means comprising filtering media contained in the canister for filtering fluid;
    at least one notch formed into the outer periphery of the base plate; and
    a locking portion of the side wall being formed radially inwardly into locking engagement with the at least one notch.

12. The filter of claim 11 wherein the at least one notch comprises a plurality of notches disposed radially around the outer periphery of the base plate.

13. The filter of claim 12 wherein the locking portion is formed via a continuous annular bead formed into the side wall portion.

14. The filter of claim 13 further comprising an annular groove formed into the outer periphery of the base plate, and a seal in the groove sealing between the side wall and the base plate.

15. The filter of claim 14 wherein the base plate comprises an exterior face and an interior face, a body of the base plate defined axially between the exterior and interior faces, and wherein notches are formed into the interior face.

16. The filter of claim 15 wherein each of said notches has a bottom and a side wall.

17. The filter of claim 16 wherein the side wall of the notch has a first portion, a second portion, and a third portion.

18. The filter of claim 17 wherein the first portion curves inwardly from the outer periphery, the second portion curves along a path generally parallel to the outer periphery, and the third portion curves inwardly from the outer periphery.

19. The filter of claim 11 wherein the locking portion has a depth, the depth of the locking portion has a range from 0.035 inches (0.09 cm) to 0.094 inches (0.24 cm).

20. The filter of claim 11, wherein the side wall includes an annular lip portion defining a terminating annular edge, the annular lip portion being wrapped radially inward over the base plate to secure the canister to the base plate.

\* \* \* \* \*